(12) United States Patent
Reddy et al.

(10) Patent No.: US 12,608,560 B2
(45) Date of Patent: Apr. 21, 2026

(54) CUSTOM-DOMAIN CONTROLLER FOR LARGE LANGUAGE MODELS

(71) Applicant: SAP SE, Walldorf (DE)

(72) Inventors: Srinivasa Byaiah Ramachandra Reddy, Bangalore (IN); Debdutt Mondal, Bangalore (IN)

(73) Assignee: SAP SE, Walldorf (DE)

( * ) Notice: Subject to any disclaimer, the term of this patent is extended or adjusted under 35 U.S.C. 154(b) by 325 days.

(21) Appl. No.: 18/229,459

(22) Filed: Aug. 2, 2023

(65) Prior Publication Data

US 2025/0045530 A1 Feb. 6, 2025

(51) Int. Cl.
*G06F 40/40* (2020.01)
*G06F 16/332* (2019.01)
*G06F 40/279* (2020.01)

(52) U.S. Cl.
CPC .......... *G06F 40/40* (2020.01); *G06F 16/3328* (2019.01); *G06F 40/279* (2020.01)

(58) Field of Classification Search
CPC .......... G06F 40/20; G06F 40/30; G06F 40/40; G06F 16/3328; G06F 16/332; G06F 40/279
See application file for complete search history.

(56) References Cited

U.S. PATENT DOCUMENTS

| | | | |
|---|---|---|---|
| 2021/0209304 A1* | 7/2021 | Yang ...................... | G06F 40/295 |
| 2021/0232613 A1* | 7/2021 | Raval Contractor .... | G06N 5/02 |
| 2025/0046434 A1* | 2/2025 | Georgescu ............. | G16H 30/40 |

* cited by examiner

*Primary Examiner* — Huyen X Vo
(74) *Attorney, Agent, or Firm* — SCHWEGMAN LUNDBERG & WOESSNER, P.A.

(57) ABSTRACT

A database of text associated with different domains is maintained. Large language models (LLMs) are prepared for use in the different domains by providing the associated text to an instance of an LLM. Thus, using multiple instances of the same pre-trained LLM, domain-specific LLMs are generated. The text provided to the LLM instance may be selected based on an account identifier of the user accessing the LLM, the tenant accessing the LLM, a user selection of a domain, or any suitable combination thereof. A pool of prepared LLM instances may be generated before the access request is received. If a response provided by an LLM instance in a domain to a prompt was rejected by a user and additional information was received during the session to improve the response of the LLM instance, the additional information may be to the text used to prepare future LLM instances for the domain.

20 Claims, 12 Drawing Sheets

1000

1010 — RECEIVE PROMPT FROM CLIENT DEVICE

1020 — PROVIDE PROMPT TO LLM INSTANCE AND ASK LLM INSTANCE TO IDENTIFY A PROPERTY OF THE PROMPT

1030 — REQUEST TEXT FROM A DATABASE BASED ON THE PROPERTY

1040 — PROVIDE THE TEXT TO THE LLM INSTANCE

1050 — PROVIDE THE PROMPT TO THE LLM INSTANCE

1060 — RECEIVE A RESPONSE FROM THE LLM INSTANCE

1070 — PROVIDE THE RESPONSE TO THE CLIENT DEVICE

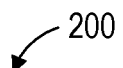
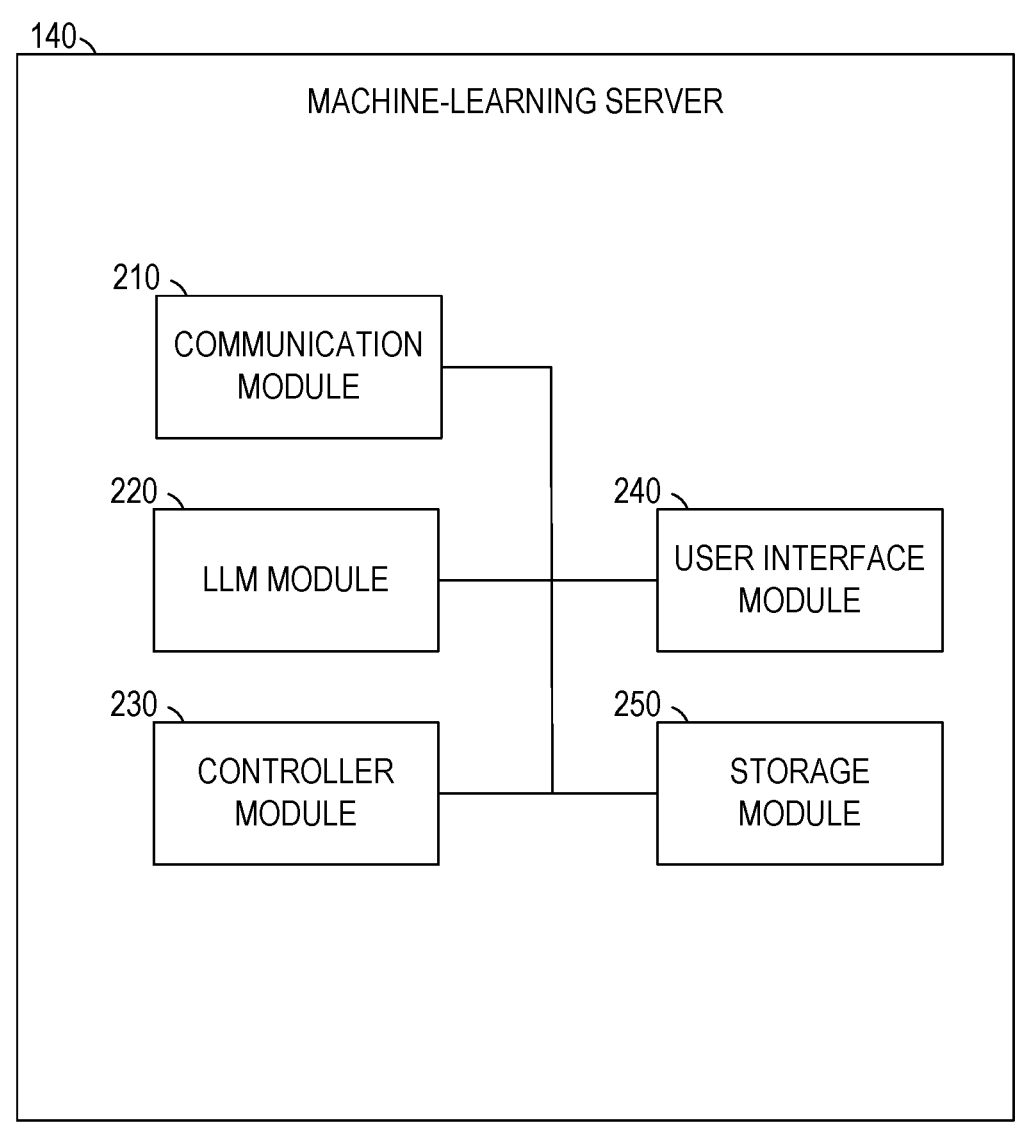
*FIG. 2*

600

| ENHANCEMENT TABLE | | | | |
|---|---|---|---|---|
| DOMAIN | TENANT | ROLE | USER | TEXT |
| BOTANY | A | NULL | NULL | |
| COMPUTER SCIENCE | A | NULL | SAM | |
| NULL | B | MANAGER | NULL | |

610 — ENHANCEMENT TABLE
620 — DOMAIN / TENANT / ROLE / USER / TEXT
630A — BOTANY ...
630B — COMPUTER SCIENCE ...
630C — NULL ...

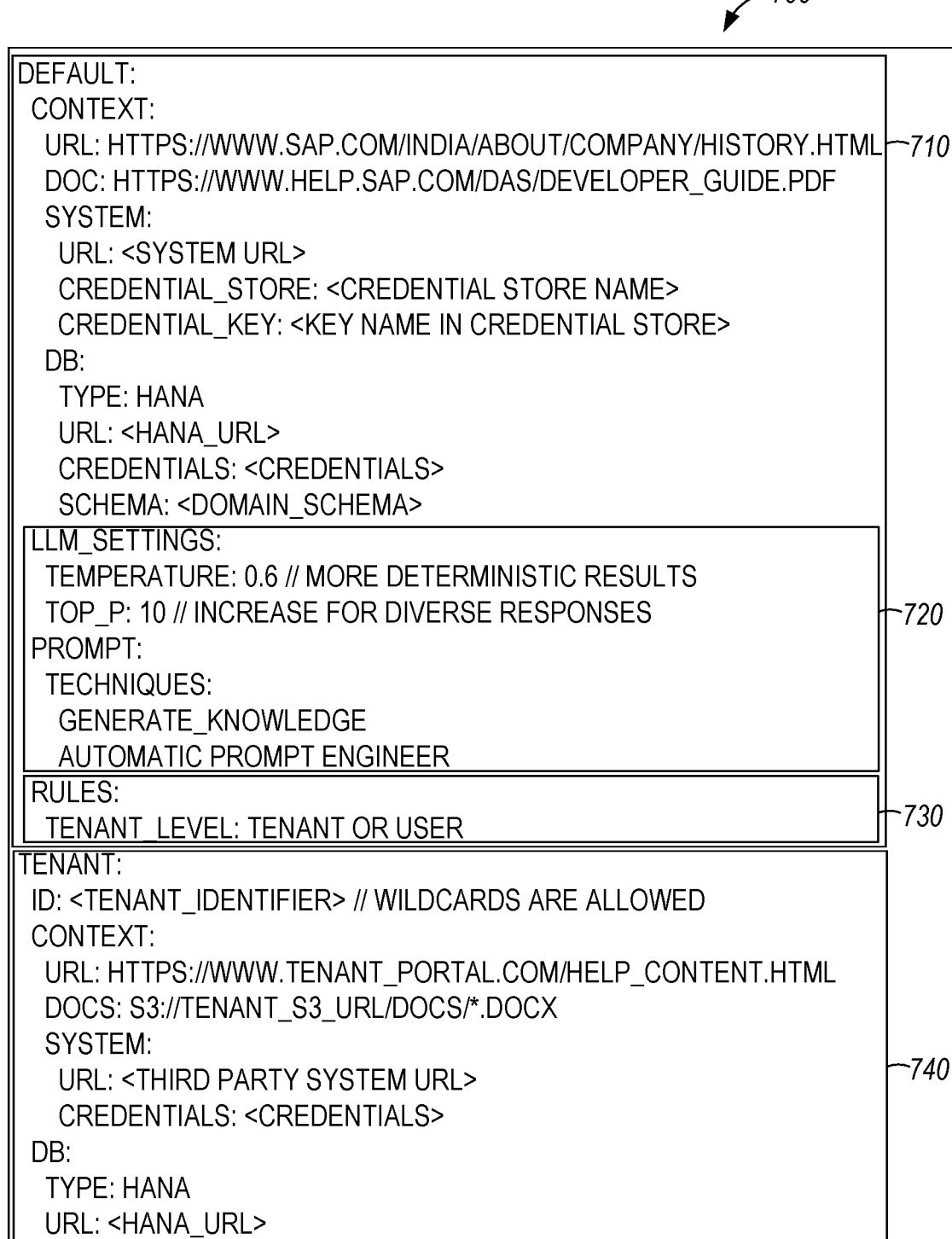

```
DEFAULT:
 CONTEXT:
  URL: HTTPS://WWW.SAP.COM/INDIA/ABOUT/COMPANY/HISTORY.HTML          710
  DOC: HTTPS://WWW.HELP.SAP.COM/DAS/DEVELOPER_GUIDE.PDF
  SYSTEM:
   URL: <SYSTEM URL>
   CREDENTIAL_STORE: <CREDENTIAL STORE NAME>
   CREDENTIAL_KEY: <KEY NAME IN CREDENTIAL STORE>
  DB:
   TYPE: HANA
   URL: <HANA_URL>
   CREDENTIALS: <CREDENTIALS>
   SCHEMA: <DOMAIN_SCHEMA>
 LLM_SETTINGS:
  TEMPERATURE: 0.6 // MORE DETERMINISTIC RESULTS
  TOP_P: 10 // INCREASE FOR DIVERSE RESPONSES                        720
 PROMPT:
  TECHNIQUES:
   GENERATE_KNOWLEDGE
   AUTOMATIC PROMPT ENGINEER
 RULES:
  TENANT_LEVEL: TENANT OR USER                                       730
TENANT:
 ID: <TENANT_IDENTIFIER> // WILDCARDS ARE ALLOWED
 CONTEXT:
  URL: HTTPS://WWW.TENANT_PORTAL.COM/HELP_CONTENT.HTML
  DOCS: S3://TENANT_S3_URL/DOCS/*.DOCX
  SYSTEM:
   URL: <THIRD PARTY SYSTEM URL>                                     740
   CREDENTIALS: <CREDENTIALS>
 DB:
  TYPE: HANA
  URL: <HANA_URL>
  CREDENTIALS: <CREDENTIALS>
  SCHEMA: <TENANT_SCHEMA>
```

```
DEFAULT:
 DYNAMIC_CONTEXT:
  KEYWORD: <KEYWORD>
   REQUEST:
    URL: <API URL>
    HEADERS: <HEADERS>
    BODY: <BODY>
   CREDENTIAL_STORE: <CREDENTIAL STORE NAME>
   CREDENTIAL_KEY: <KEY NAME IN CREDENTIAL STORE>
```

_810_

900

910 ─ BASED ON A DOMAIN FOR A SESSION WITH A LARGE LANGUAGE MODEL (LLM), SELECT A SET OF INPUT TEXT FROM A DATABASE

920 ─ PROVIDE THE SELECTED SET OF INPUT TEXT TO AN INSTANCE OF THE LLM TO PREPARE THE LLM INSTANCE FOR THE SESSION

930 ─ CAUSE A USER INTERFACE TO BE PRESENTED THAT ALLOWS A USER TO INTERACT WITH THE PREPARED LLM INSTANCE

*1000*

1010 — RECEIVE PROMPT FROM CLIENT DEVICE

1020 — PROVIDE PROMPT TO LLM INSTANCE AND ASK LLM INSTANCE TO IDENTIFY A PROPERTY OF THE PROMPT

1030 — REQUEST TEXT FROM A DATABASE BASED ON THE PROPERTY

1040 — PROVIDE THE TEXT TO THE LLM INSTANCE

1050 — PROVIDE THE PROMPT TO THE LLM INSTANCE

1060 — RECEIVE A RESPONSE FROM THE LLM INSTANCE

1070 — PROVIDE THE RESPONSE TO THE CLIENT DEVICE

CUSTOM-DOMAIN CONTROLLER FOR LARGE LANGUAGE MODELS

TECHNICAL FIELD

The subject matter disclosed herein generally relates to generative artificial intelligence (AI). Specifically, the present disclosure addresses systems and methods to implement a custom-domain controller for large language models (LLMs).

BACKGROUND

LLMs are trained on large amounts of text data. Using a transformer architecture, LLMs learn the relationships between words and phrases in natural language. After training, an LLM generates text based on an input prompt. Public pre-trained LLMs such as ChatGPT are generic AI models and do not reliably provide correct information in specific domains. Custom LLMs are created by controlling the text data used for training, which consumes a substantial amount of time and computing resources. Adding knowledge to an LLM is also achieved by retraining the LLM.

BRIEF DESCRIPTION OF THE DRAWINGS

FIG. 2 is a block diagram of a machine-learning server suitable for a custom-domain controller for LLMs, according to some example embodiments.

FIG. 6 is a block diagram illustrating a database schema, suitable for storing data for use by a custom-domain controller, according to some example embodiments.

FIG. 7 illustrates an example configuration file, suitable for use by a custom-domain controller to identify text to be provided to an LLM instance, according to some example embodiments.

DETAILED DESCRIPTION

Example methods and systems are directed to improving usefulness of LLMs in different knowledge domains. Public pre-trained LLMs (e.g., ChatGPT) are generic AI models that lack specialized knowledge (e.g., knowledge for a particular business field, company, subject matter, product line, technology, or the like). Training an LLM for a specific domain consumes substantial computing resources and time. However, the results provided by an LLM can also be modified by providing text input to the LLM.

As used herein, a trained LLM refers to the structure of the LLM and the values of the internal variables generated after training. The trained LLM can be stored in long-term storage (e.g., hard disk drives) or copied into RAM for execution. The copy of the LLM is referred to as an instance of the LLM herein. During user interactions with the LLM instance or by virtue of programmatic input of text to the LLM instance, the values of the internal variables of the LLM instance may change. As a result, the LLM instance differs from the trained LLM.

A database of text associated with different domains is maintained. LLM instances are prepared for use in the different domains by providing the associated text to the instance of the LLM before the instance is used. Thus, by using multiple instances of the same pre-trained LLM, domain-specific LLMs are generated without repeating the training process.

The text provided to the LLM instance may be selected based on an account identifier of the user accessing the LLM, the tenant accessing the LLM, a user selection of a domain, or any suitable combination thereof. To reduce the delay between receiving a request for an LLM prepared for a certain domain and the provision of the LLM instance to a user, a pool of prepared LLM instances may be generated before the access request is received. In response to the access request, the requesting user is enabled to interact with the already prepared LLM instance.

Using the systems and methods described herein, responses provided by domain-specific LLMs are more germane than responses provided by generic LLMs. Additionally, a multi-tenant system using the systems and methods described herein protects privacy better than a system using a shared LLM instance.

Figure 1:
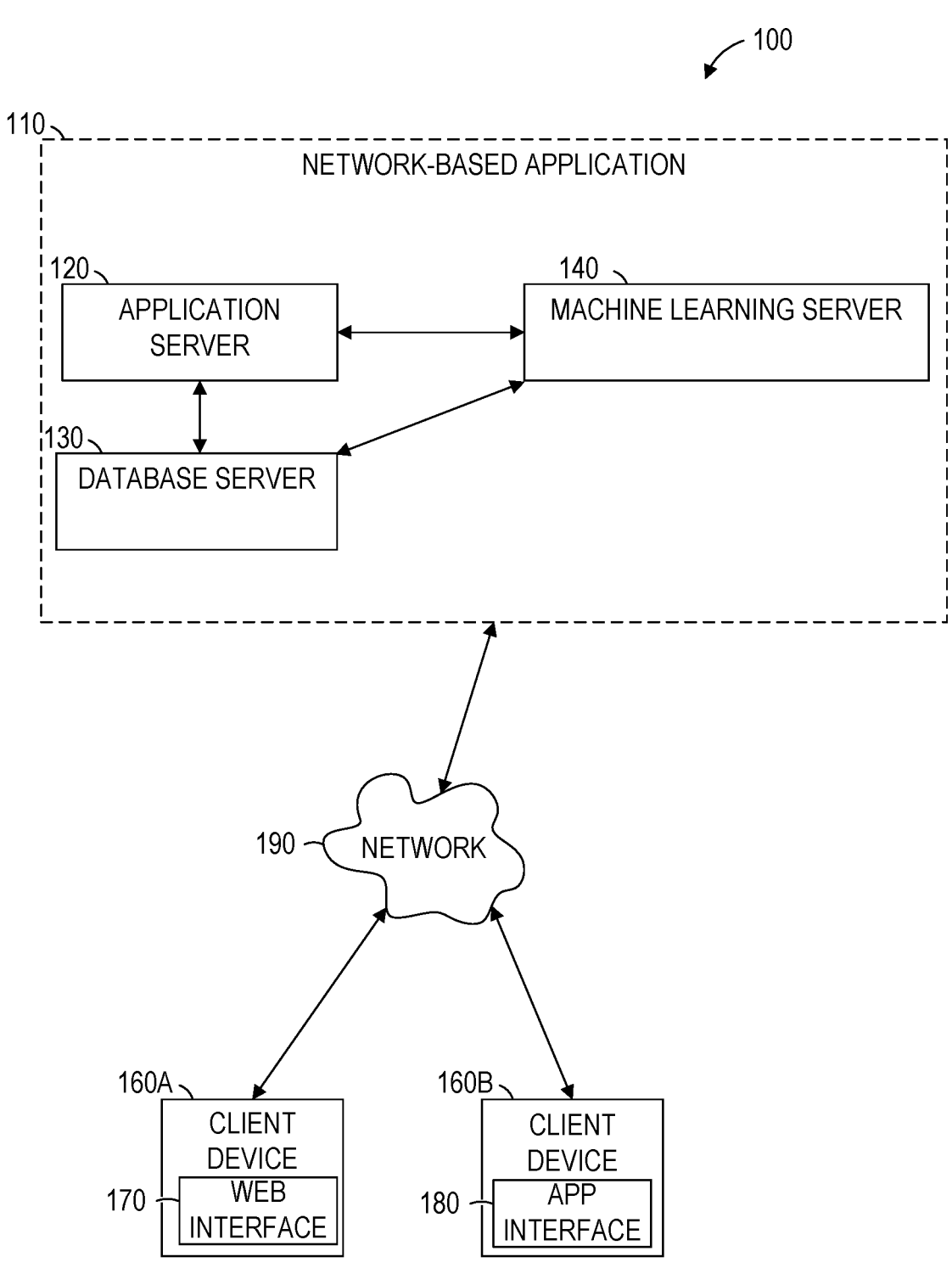
FIG. 1 is a network diagram illustrating an example network environment suitable for a custom-domain controller for LLMs.

FIG. 1 is a network diagram illustrating an example network environment 100 suitable for a custom-domain controller for LLMs. The network environment 100 includes the network-based application 110, client devices 160A and 160B, and a network 190. The network-based application 110 is provided by an application server 120 in communication with a database server 130 and a machine-learning server 140. The application server 120 accesses application data (e.g., application data stored by the database server 130) to provide one or more applications to the client devices 160A and 160B via a web interface 170 or an application interface 180. The client devices 160A and 160B may be referred to generically as a client device 160 or in the aggregate as client devices 160.

The machine-learning server 140 provides one or more LLMs. Users of the client devices 160 may interact with the LLMs using a chat interface provided by the application server 120. At the beginning of a chat session, the LLM may be in an initial state based on prior training. During the chat session, the values of internal variables may change. As a result, output of the LLM in response to a prompt in a session may differ depending on prior prompts presented in the session. After the session ends, the instance of the LLM may be discarded. As a result, a subsequent chat session begins with a new instance of the LLM with values of internal variables that result from the training but not from any text inputs to the individual instance.

Text from one or more chat sessions may be stored by the database server 130. When a future chat session is begun, the stored text may be selectively provided to the LLM instance for the chat session. As a result, changes in the prior LLM instance recur in the new LLM instance. By using selection criteria to determine which text is provided to the new LLM instance, undesirable changes (e.g., those that decrease the usefulness of responses provided by the LLM) are avoided.

The application server 120, the database server 130, the machine-learning server 140, and the client devices 160A and 160B may each be implemented in a computer system, in whole or in part, as described below with respect to FIG. 12. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the machine-learning server 140, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one application server 120, one network-based application 110, two client devices 160A-160B, and the like), any number of each element is contemplated. For example, the database server 130 may include dozens or hundreds of active and standby servers and provide data to multiple application servers 120 that provide applications to millions of client devices. Likewise, each application server 120 may access LLMs from multiple machine-learning servers 140 and each machine-learning server 140 may provide LLMs to multiple application servers 120, access data from multiple database servers 130, and so on.

FIG. 2 is a block diagram 200 of a machine-learning server 140 suitable for a custom-domain controller for LLMs, according to some example embodiments. The machine-learning server 140 is shown as including a communication module 210, an LLM module 220, a controller module 230, a user interface module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the machine-learning server 140 and transmits data from the machine-learning server 140. For example, the communication module 210 may receive, from application server 120 or the client device 160A or 160B, a request for an LLM instance.

The LLM module 220 trains an LLM (a type of machine-learning model) using training data, uses the trained LLM, or both. For example, the machine-learning model may be trained, using large amounts of publicly available text, to predict the text that will follow from any text input. Thereafter, the machine-learning model may receive text input (also referred to as a "prompt") and generate text output. LLMs perform natural language processing (NLP). Input text is mapped to vectors in a high-dimensional space (e.g., vectors of hundreds or thousands of elements) such that words with similar meanings have vectors that are closer together than words with dissimilar meanings. Additionally, relationships between vectors may be maintained. For example, the relationship between the vector for "king" and "queen" may be the same as the relationship between the vector for "man" and "woman." Thus, manipulation of vectors may have semantic meaning when the vectors are converted back to human-readable language.

The controller module 230 provides a custom-domain controller for LLMs. Text input to an LLM instance that improves the results provided by the LLM instance (e.g., as judged by a human user of the LLM instance) is stored via the storage module 250 and used as input to a future LLM instance before providing that LLM instance to a user for interaction. For example, a "bare" instance of an LLM that provides responses based on training but not on further text inputs may give an incorrect answer to a factual question. In response, a user may provide the correct response to the LLM. When the question is asked again, the "experienced" LLM may provide the correct answer. After the session, the user-provided input is stored in a database in association with an account identifier for the user, a tenant for the account, a role for the account, a subject-matter domain for the session, or any suitable combination thereof. Before another LLM session is begun with a user having the same account identifier, tenant, or role, or for a session with the same subject-matter domain, or any suitable combination thereof, the stored input is provided to the new bare LLM, converting it to an experienced LLM even though no user interaction has yet taken place. As a result, the user will be provided the correct response if the same question is asked.

A user interface for accessing the LLM is provided by the machine-learning server 140 (or the application server 120) using the user interface module 240. For example, a hypertext markup language (HTML) document may be generated by the user interface module 240, transmitted to a client device 160 by the communication module 210, and rendered on a display device of the client device 160 by a web browser executing on the client device 160. The user interface may comprise text fields, drop-down menus, and other input fields. For example, the user may be prompted with a chat interface to interact with an LLM instance.

Prompts, results, machine-learning models, training data, or any suitable combination thereof may be stored and accessed by the storage module 250. For example, local storage of the machine-learning server 140, such as a hard drive, may be used. As another example, network storage may be accessed by the storage module 250 via the network 190.

Figure 3:
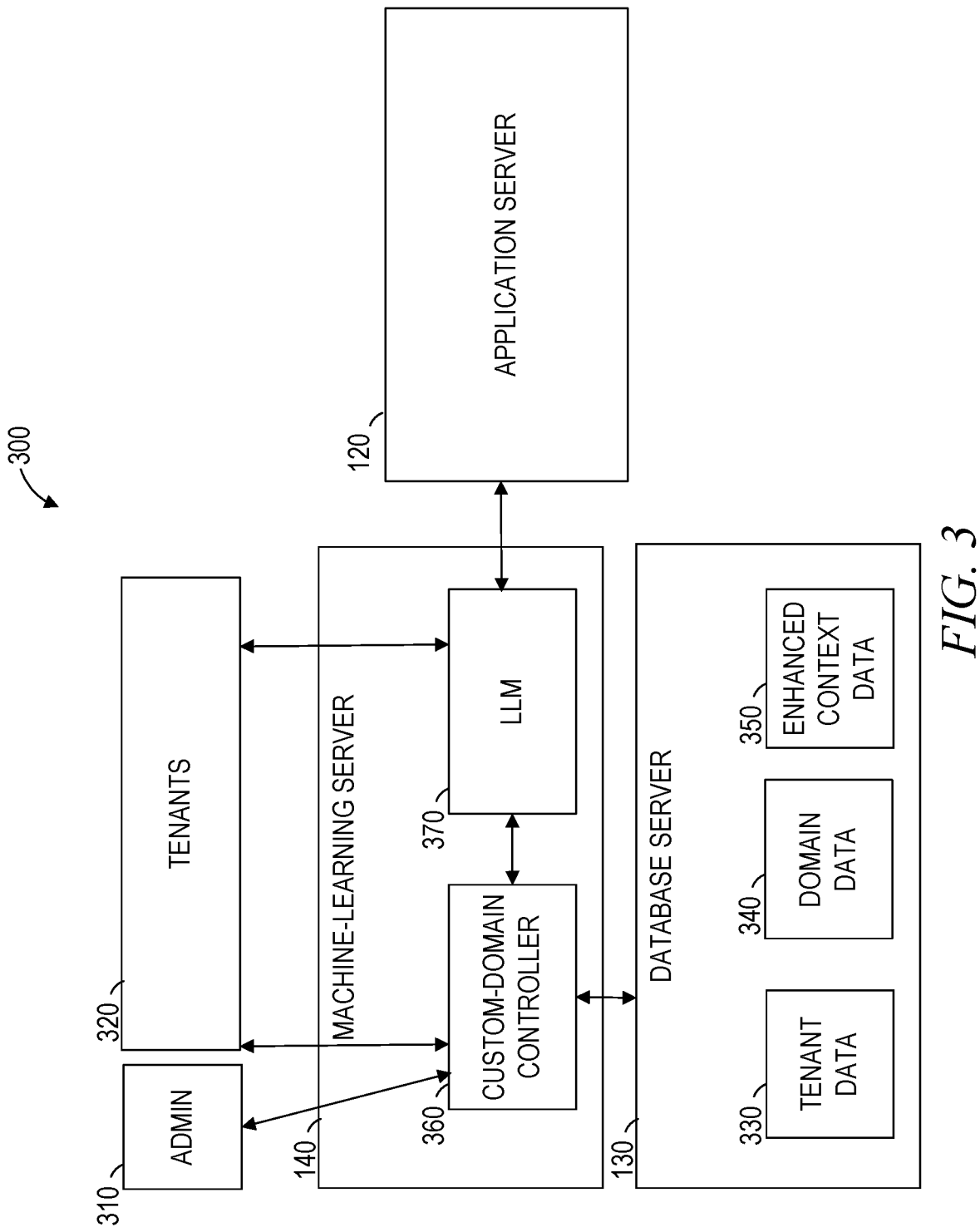
FIG. 3 is a block diagram showing use of a custom-domain controller for LLMs, according to some example embodiments.

FIG. 3 is a block diagram 300 showing use of a custom-domain controller for LLMs, according to some example embodiments. Within the machine-learning server 140, the custom-domain controller 360 acts as a gateway to the LLM 370. The custom-domain controller 360 is configured for a custom domain, user, tenant, role, or any suitable combination thereof. During an initialization phase, the custom-domain controller 360 loads tenant, user, role, or domain data into a learning context and provides the learning context to an instance of the LLM.

Thus, rather than retraining the LLM using different training data, the custom-domain controller 360 leverages the LLM's internal capability to learn new context from input received after training. Static context is loaded at the beginning of a session. Dynamic context is loaded during a session. An administrator 310 may provide configuration data to the custom-domain controller 360. Different tenants 320 may also provide configuration data to the custom-domain controller 360. When the application server 120 or a user of one of the tenants 320 accesses the LLM 370, an instance of the LLM is created and, based on the configuration data, the custom-domain controller 360 accesses tenant data 330, domain data 340, enhanced content data 350, or any suitable combination thereof from the database server 130.

Figure 4:
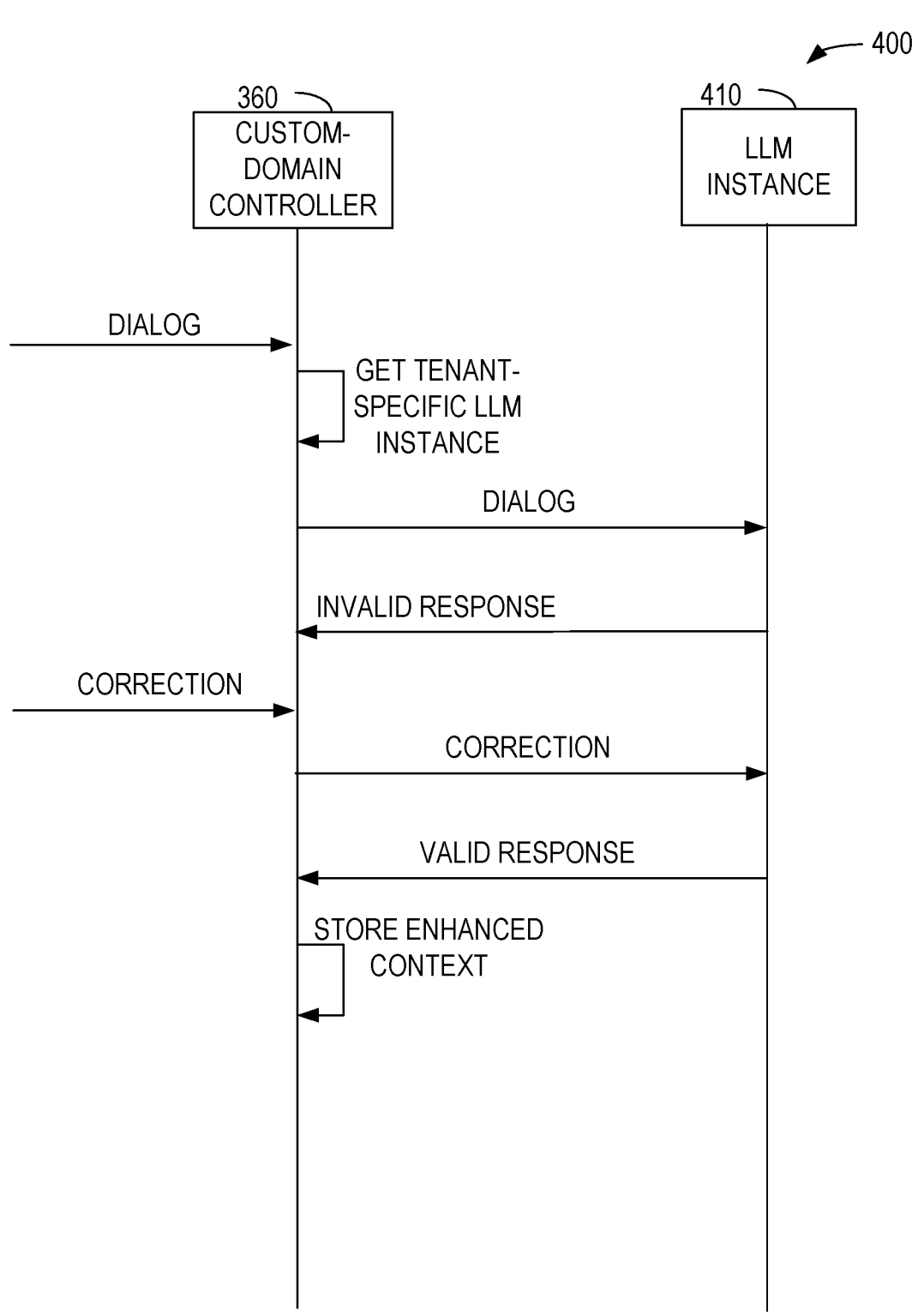
FIG. 4 is a swim lane diagram, showing communications and operations of a custom-domain controller and an LLM instance, according to some example embodiments.

FIG. 4 is a swim lane diagram 400, showing communications and operations of the custom-domain controller 360 and an LLM instance 410, according to some example embodiments. A user of one of the client devices 160 of FIG. 1 associated with one of the tenants 320 of FIG. 3 provides text to the custom-domain controller 360 for provision to the LLM 370. Based on information about the user (e.g., user name, tenant, role, job title, or any suitable combination thereof), the custom-domain controller 360 gets a tenant-specific LLM instance 410 of the LLM 370. The tenant-specific LLM instance 410 may differ from LLM instances for other tenants by virtue of different sets of input text that are provided based on the tenant (or domain, role, and the like).

In some example embodiments, a pool of LLM instances is instantiated when the custom-domain controller 360 is started. When a session with an LLM instance begins, the LLM instance is taken from the pool. When the session ends, the LLM instance is deleted. A new LLM instance may be instantiated when another LLM instance is deleted, maintaining the size of the pool. For example, each tenant may have a dozen or a hundred LLM instances in a tenant-specific pool. As another example, the pooling may be performed at the user, tenant, or role level, or any suitable combination thereof.

The custom-domain controller 360 sends the text received from the client device 160 to the LLM instance 410. In response to the received text, the LLM instance 410 generates a response and updates its internal variables. In this example, the response provided by the LLM instance 410 is invalid. For example, the dialog may have asked a factual question and the LLM may have provided an incorrect answer. The user provides to the custom-domain controller 360 a correction for the invalid response, and the custom-domain controller 360 forwards the correction to the LLM instance 410.

The custom-domain controller 360 may determine that the response provided by the LLM instance to a prompt received via the user interface was rejected by the user by using another machine-learning model, by recognizing words in the user's next response (e.g., "no" or "incorrect"), or any suitable combination thereof. For example, a convolutional neural network (CNN) may be trained to detect text that indicates that an LLM's response was incorrect. Each prompt provided by the user to the LLM may also be provided to the CNN. When the CNN indicates that the user rejected the LLM instance's response, and based on a determination that additional information was received during the session to improve the response of the LLM instance, the custom-domain controller 360 adds the additional information to the set of input text.

The LLM instance 410 responds to the correction by generating a new response and again updating its internal variables. In this example, the response is a valid response. For example, the correction provided by the user may correct the factual error in the invalid response, and the LLM instance 410 may respond by acknowledging the error and the correction.

The custom-domain controller 360 stores the correction in a database in association with the user, tenant, role, job title, domain, or any suitable combination thereof. In this way, after the session with the prepared LLM instance 410, the custom-domain controller adds text of the session to the set of input text for use the next time an LLM instance is created for this domain, user, tenant, role, job title, or any suitable combination thereof. For example, after the session with the prepared LLM instance, the correction, which is a portion of the text of the session, may be added to a first set of input text for the domain of the session and to a second set of input text for the tenant of the session. Later instances created for either the domain or the tenant will then be prepared with the correction.

Figure 5:
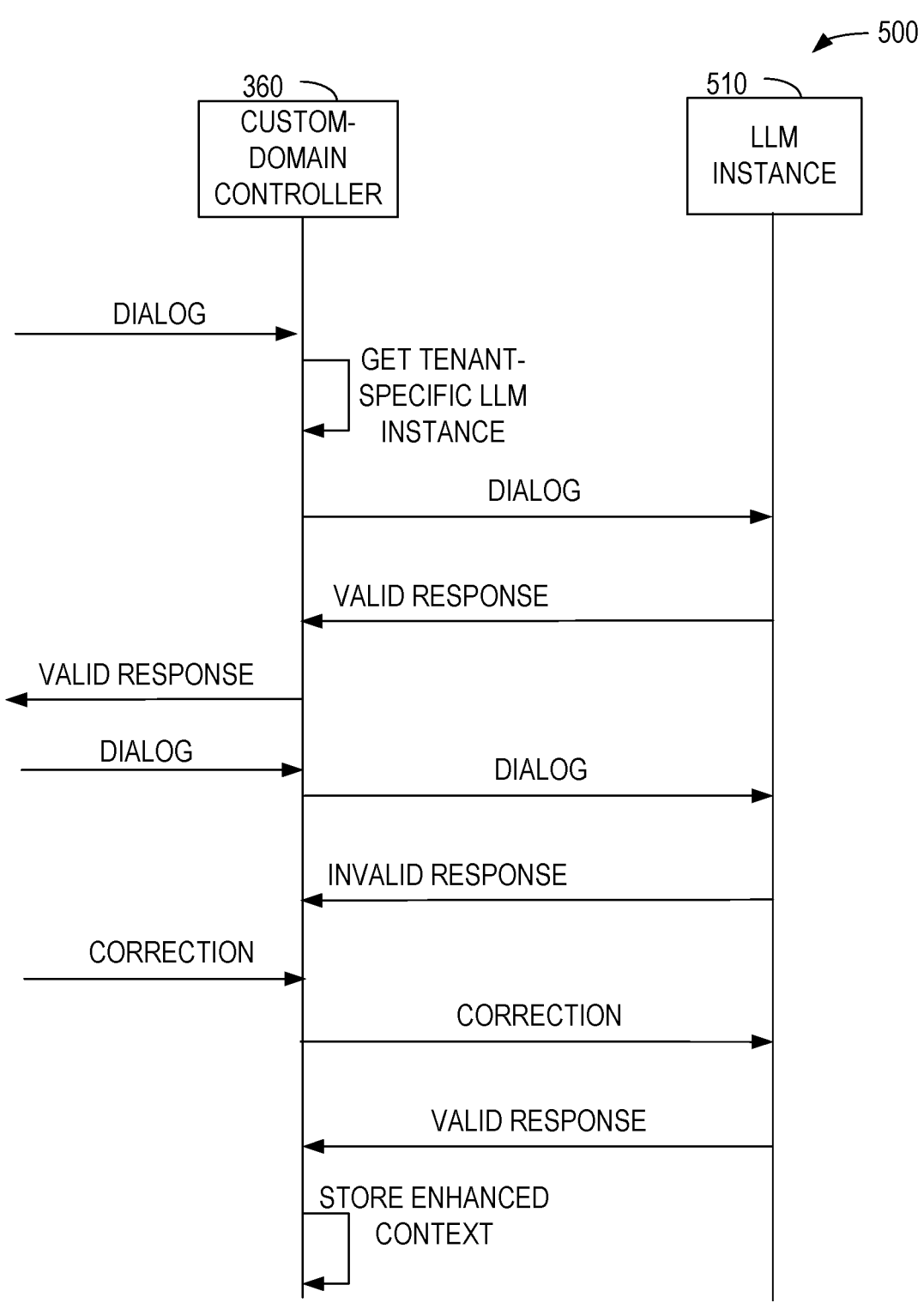
FIG. 5 is a swim lane diagram, showing communications and operations of a custom-domain controller and an LLM instance, according to some example embodiments.

FIG. 5 is a swim lane diagram 500, showing communications and operations of the custom-domain controller 360 and an LLM instance 510, according to some example embodiments. A user of one of the client devices 160 of FIG. 1 associated with one of the tenants 320 of FIG. 3 provides text to the custom-domain controller 360 for provision to the LLM 370. Based on information about the user (e.g., user name, tenant, role, job title, or any suitable combination thereof), the custom-domain controller 360 gets a tenant-specific LLM instance 510 of the LLM 370. For the purposes of this example, the selection criteria for the LLM instance 510 are the same as those for the LLM instance 410. For example, the LLM instances 410 and 510 may be tenant-specific LLM instances that are the same for all users and roles of the tenant. The user providing the dialog in FIG. 5 may be a different user than the user providing the dialog in FIG. 4, but both users are from the same tenant.

When the custom-domain controller 360 gets a tenant-specific LLM instance for a session occurring after the interaction in FIG. 4, the step of getting the tenant-specific LLM instance 510 includes providing the enhanced context that was stored in the earlier session of FIG. 4. As a result, when the dialog is provided to the LLM instance 510, the LLM instance 510 provides a valid response.

During the session with the LLM instance 510, the LLM instance 510 may generate another invalid response and receive a correction. Thus, further enhanced context may be stored. When another LLM instance is created for the tenant, the additional enhanced context will be provided to the LLM instance before providing text from the user. Over the course of repeated sessions, the tenant-specific LLM will accumulate a body of tenant-specific knowledge, increasing the usefulness of the tenant-specific LLM over an LLM instance that does not receive the enhanced context.

FIG. 6 is a block diagram illustrating a database schema 600, suitable for storing data for use by a custom-domain controller, according to some example embodiments. The database schema 600 includes an enhancement table 610. The enhancement table 610 includes rows 630A, 630B, and 630C of a format 620.

Each row of the enhancement table 610 contains text associated with a subject-matter domain, a tenant, a role, a user, or any suitable combination thereof. When an LLM instance is prepared for the identified subject-matter domain, tenant, role, user, or combination thereof in a row, the text of the row is provided to the LLM instance. For example, the text of the row 630A may be provided to all LLM instances of tenant A. As another example, the text of the row 630A may be provided to an LLM instance of tenant A after determining that the user is interested in botany. In some example embodiments, detection of the user's interest in a particular subject-matter domain is determined by comparing words in the user-provided text to a set of words associated with the subject matter. For example, if the user's text includes "botany," "plants," or "life science," and the user is associated with tenant A, the text of the row 630A may be provided to the LLM instance with which the user is interacting before providing the user's text to the LLM instance to generate a response.

The text of the row 630B may be provided to all LLM instances of the user Sam of the tenant A. Or, as discussed above with respect to botany and the row 630A, the text of the row 630B may be provided to the LLM instance in response to determining that Sam is raising the subject matter of "computer science." The text of the row 630C may be provided to all instances of user's having the role of manager and belonging to tenant B.

In some example embodiments, the user, tenant, and role of the user of the session that generated the text is stored in the enhancement table 610. An administrator may determine the granularity used to select the enhancement text to provide to future LLM instances. For example, the user field may be ignored, causing enhancement text from all users of a tenant or role to be used in future LLM instances for all users of the tenant or role. Alternatively, the user field may be filtered on, causing enhancement text for an LLM instance of a user to be limited to the enhancement text generated by the same user in previous sessions.

Though the database schema 600 shows only one table and only a few rows, any number of tables and rows are contemplated. For example, the enhancement table 610 may store enhancement data for dozens, hundreds, or thousands of users, tenants, roles, and domains.

FIG. 7 illustrates an example configuration file 700, suitable for use by a custom-domain controller to identify text to be provided to an LLM instance, according to some example embodiments. The example configuration file 700 includes sections 710, 720, 730, and 740. The custom-domain controller 360 of FIG. 3 may use the example configuration file 700 to configure an LLM instance. In the example configuration file 700, text enclosed in angle brackets is a placeholder for the actual text that would be included. For example, "<CREDENTIALS>" indicates that an administrator would insert the actual credentials for authentication with a particular server or database in that location of the configuration file 700.

The section 710, labeled "default," identifies text to be provided to all LLM instances created by the custom-domain controller 360. The "context" subsection identifies an HTML document and a PDF document by URL. The custom-domain controller 360 may be authenticated in accessing the documents by providing the system URL and a credential key accessed from a credential store. The "DB" subsection identifies a database type, database URL, credentials for accessing the database, and a schema or query to select text from the database. The text from the identified documents and database schema may be provided to all LLM instances created by the custom-domain controller 360.

The sections 720 and 730 are part of the "default" configuration and concern LLM settings (section 720) and rules for determining which tenant configurations to apply (section 730). Temperature is an input parameter for each LLM prompt that ranges from zero to one. The temperature affects the randomness of the LLM's output, with a higher temperature resulting in a more creative response and a lower temperature resulting in more factual output. When the temperature is 0, the most probable word is selected for each position of the output. As the temperature increases, less and less likely words are included in a random selection to be used for the output. Top-p is another configuration parameter that controls the randomness of LLM output. The LLM selects from the most likely (or "top") tokens with cumulative probability of Top-p. For example, if top-p is 10%, the most likely token is "country" at 8%, followed by "state" at "5%," "city" at 3%, and many other tokens at lower percentage probabilities, the LLM will select between "country" and "state" and ignore the lower probability tokens. The selection may be based on the relative probabilities within the group filtered by top-p. Continuing with this example, "country" may be selected with 62% probability and "state" may be selected at 38% probability. With top-p of 100%, all possible words are permissible and will be selected based on their computed probability without additional filtering.

The section 720 may include options relating to the manner in which text is provided to the LLM to prepare it and the way the LLM is requested to respond to user inputs. For example, the LLM settings in the section 720 may include settings relating to prompt engineering, few-shot prompting, chain-of-thought prompting, generative knowledge prompting, react prompting, or any suitable combination thereof.

Prompt engineering involves providing instructions to the LLM as to how to respond to prompts. For example, prior to asking the LLM a question, the instruction "Provide an answer to an IT professional" or "Provide an answer to a novice user" may be given. Depending on the instruction, the output of the LLM in response to a question that follows will differ, as appropriate for the indicated audience.

The providing of text to the LLM to prepare it for use may be in the form of few-shot prompting. In few-shot prompting, a few examples of both inputs and outputs are provided to the LLM as examples for how the LLM should respond to future inputs. Each previous conversation in which a user provided a prompt and the LLM provided a correct response is an example.

Chain-of-thought prompting results in the LLM providing the reasoning for its responses. Chain-of-thought prompting can be selected by providing an explicit instruction to the LLM, such as "Let's think step by step." Alternatively, few-shot prompting may be used in which the example responses include reasoning.

Generative knowledge prompting, like chain-of-thought prompting, can be selected either by providing an explicit instruction or using few-shot prompting to provide examples. With generative knowledge prompting, the LLM is asked to describe its knowledge on a topic before providing an answer to a prompt. For example, an input may be provided to the LLM. In response, the LLM provides its knowledge on the topic. Then a question relating to the knowledge is provided. Because of the previous interaction in which the knowledge was generated, the LLM's answer to the question is more likely to be grounded in reality and less likely to be a hallucination.

React prompting involves detecting the topic of a prompt and providing additional information to the LLM before the LLM provides a response to the prompt. For example, the LLM may detect a topic of a prompt and perform a database or web search for information on the topic. After ingesting the results of the search, the LLM generates a response to the prompt. As discussed below with respect to FIG. 8, specific react prompting behaviors may be configured by the administrator.

The tenant rules in the section 730 indicates that the tenant-specific configuration in the section 740 should be applied if either the tenant or the user matches the ID entry of the tenant-specific configuration. While only one "default" configuration is included in the configuration file, multiple "tenant" configurations may be included. Like the "default" section, the "tenant" section identifies files and/or databases that contain text that will be provided to LLM instances. Unlike the "default" section, the text identified by the "tenant" section is not provided to all LLM instances, instead it is provided only if the session matches the tenant ID, according to the rules.

Figure 8:
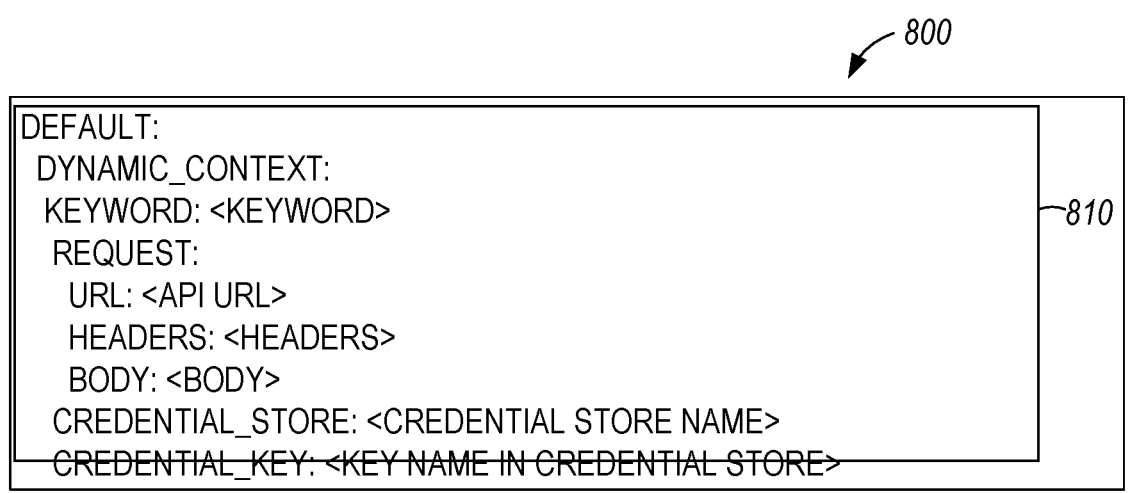
FIG. 8 illustrates an example configuration file, suitable for use by a custom-domain controller to identify text to be provided to an LLM instance, according to some example embodiments.

FIG. 8 illustrates an example configuration file 800, suitable for use by a custom-domain controller to identify text to be provided to an LLM instance, according to some example embodiments. The section 810 includes a "dynamic_context" subsection. The dynamic_context subsection may be included in the default section of FIG. 7.

Dynamic context refers to the provision of text to an LLM instance after a user has begun interacting with the LLM instance. By contrast, the sections discussed above with respect to FIG. 7 relate to static context, which refers to the provision of text to the LLM instance before the user begins interacting with the LLM instance.

The custom-domain controller 360 detects when the user provides text to the LLM that includes the identified <KEY-WORD>. When that happens, a hypertext transfer protocol (HTTP) request is sent to the identified URL, with the identified headers and body, using credentials retrieved from the identified credential store for the identified credential key. The text received in response to the HTTP request is provided to the LLM instance before passing on the user-provided text that included the keyword. As a result, the response from the LLM instance is enhanced.

The use of dynamic context allows deferring the retrieving of the text and the processing of the text by the LLM instance. This may make supporting a large number of dynamic contexts feasible. For example, the custom-domain controller 360 may be configured to support one hundred different dynamic contexts in a configuration file. However, a typical session may use only one or two of the keywords. As a result, the relevant dynamic context is loaded for each LLM instance while doing only one or two percent of the work of processing the text for all of the supported dynamic contexts. An administrator may choose whether to put information for files or databases in the (static) context section or the dynamic_context section based on expected frequency of use.

Figure 9:
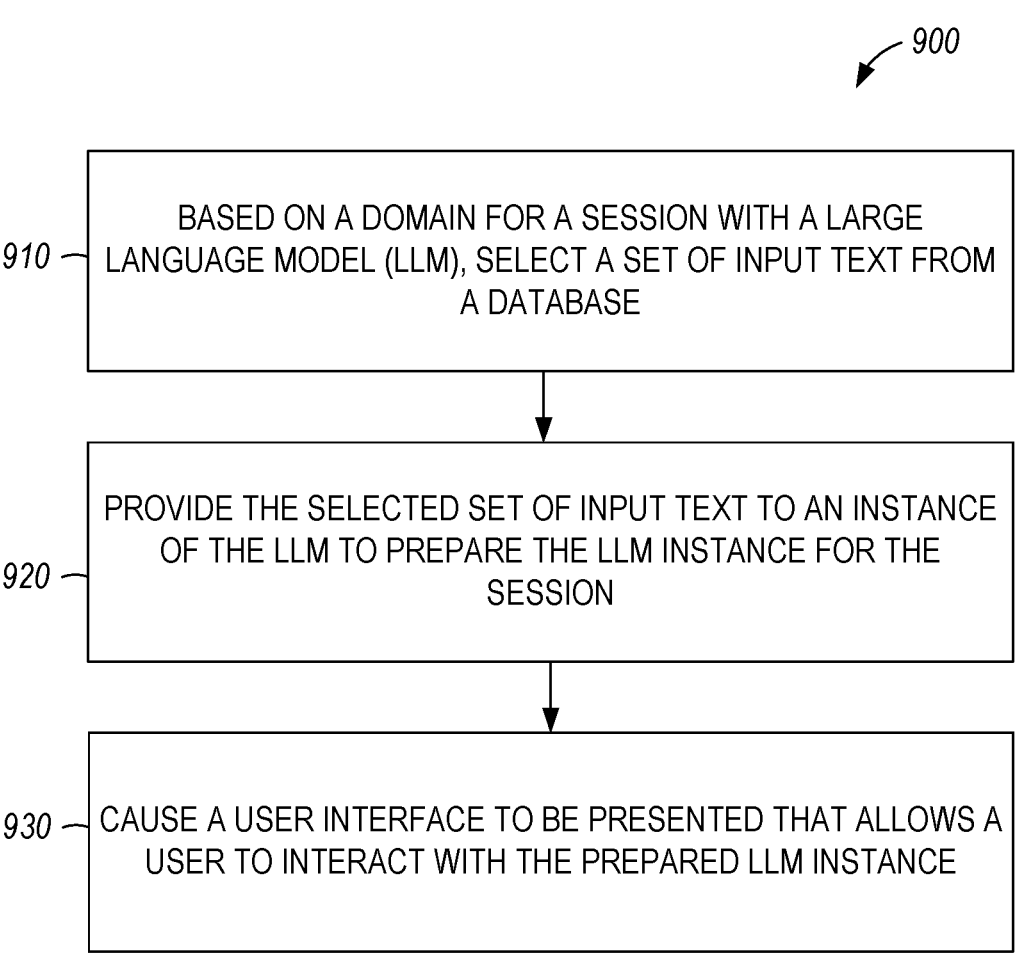
FIG. 9 is a flowchart illustrating operations of an example method suitable for a custom-domain controller.

FIG. 9 is a flowchart illustrating operations of an example method 900 suitable for a custom-domain controller. The method 900 includes operations 910, 920, and 930. By way of example and not limitation, the method 900 may be performed by the custom-domain controller 360 of the machine-learning server 140 using the database schema 600 as shown in FIGS. 1-3 and 6.

In operation 910, custom-domain controller 360, based on a domain for a session with an LLM, selects a set of input text from a database. For example, a company may use an LLM to answer questions about different software products. A user requesting help may indicate which software product will be discussed. Thus, in this example, the domain for the session with the LLM is the software product indicated by the user. Text from the enhancement table 610 may be selected, e.g., using the psuedo-SQL "SELECT TEXT from ENHANCEMENT TABLE where DOMAIN=% DOMAIN %."

In the example of FIG. 9, the set of input text is selected from the database based on the domain. In other example embodiments, the set of input text is selected from the database based on a tenant for the session with the LLM, a role of the user for the session with the LLM, or any suitable combination thereof. For example, text from the enhancement table 610 may be selected using the pseudo-SQL "SELECT TEXT from ENHANCEMENT TABLE where TENANT=% TENANT" or "SELECT TEXT from ENHANCEMENT TABLE where ROLE=% ROLE %." The text resulting from tenant-based, domain-based, and role-based queries may, together, form the selected set of input text. Other criteria may be used to select additional text, such as the user name, job title, or any suitable combination thereof.

The custom-domain controller 360, in operation 920, provides the selected set of input text to an instance of the LLM to prepare the LLM instance for the session. For example, a new instance of the LLM may be created. The selected set of input text is provided to the new instance of the LLM. As a result, the prepared LLM instance may provide different responses to prompts than an instance that has not received the selected set of input text. As discussed with regard to FIGS. 4-5, the results of the instance of the LLM may be improved in this manner.

In operation 930, the machine-learning server 140 or the application server 120 causes a user interface to be presented that allows a user to interact with the prepared LLM instance. For example, a chat interface may be presented in the web interface 170 of the client device 160A of FIG. 1. Using the chat interface, the user provides additional text, which the custom-domain controller 360 provides to the prepared LLM instance. In response, the prepared LLM instance generates responsive text, which is presented to the user via the chat interface.

The method 900 may be performed in response to a user request for an LLM on a domain. In other example embodiments, operations 910 and 920 are performed for a number of domains before a user request is received, causing the custom-domain controller 360 to prepare a plurality of LLM instances by providing different input text to each LLM instance of the plurality of LLM instances. In response to a user request for an LLM on a domain, an LLM instance that was already prepared on the domain is selected and used in operation 930. In this way, delay between the request for the LLM and the provision of the user interface to interact with the LLM instance is reduced.

Figure 10:
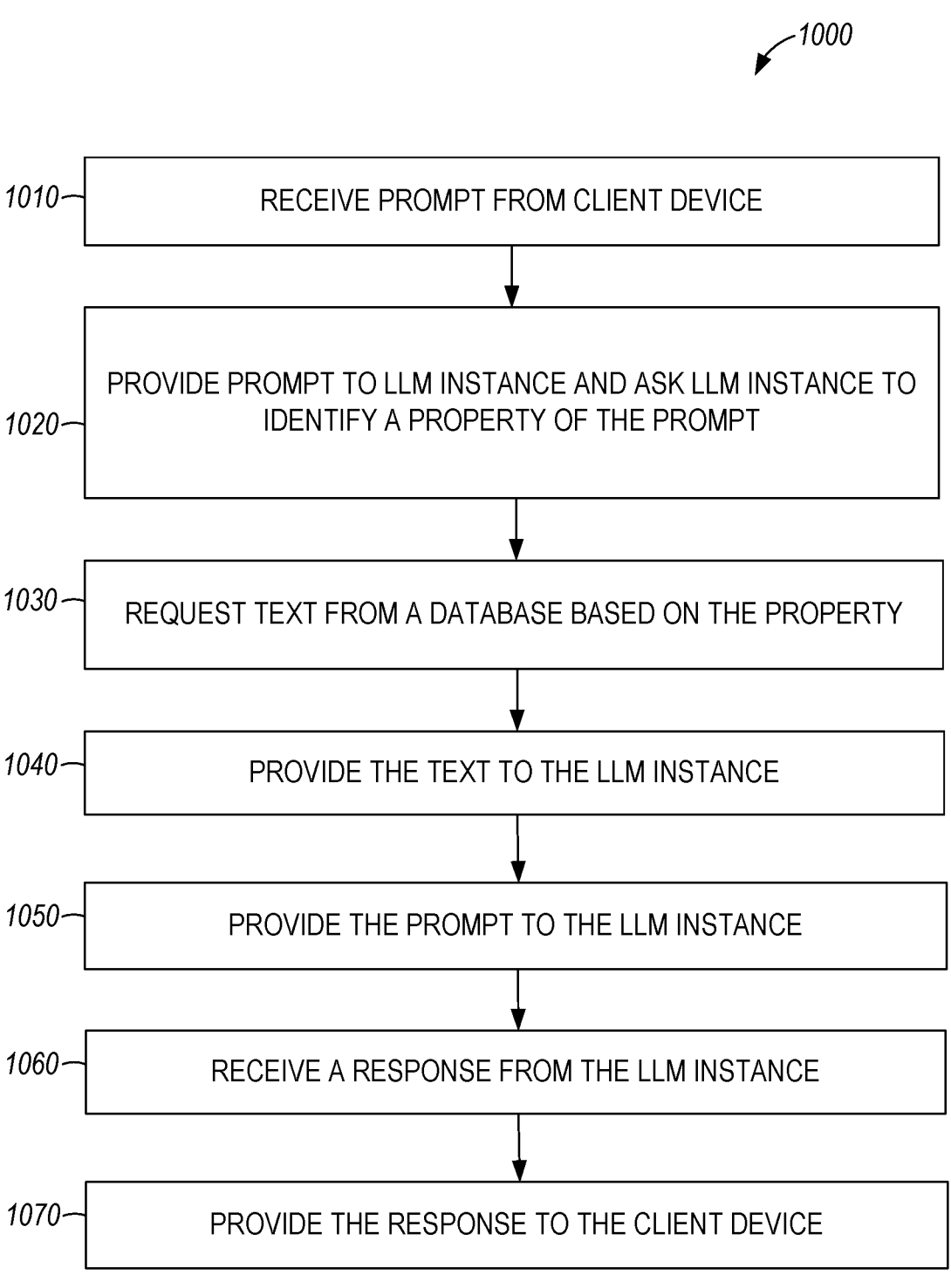
FIG. 10 is a flowchart illustrating operations of an example method suitable for a custom-domain controller.

FIG. 10 is a flowchart illustrating operations of an example method 1000 suitable for a custom-domain controller. The method 1000 includes operations 1010, 1020, 1030, 1040, 1050, 1060, and 1070. By way of example and not limitation, the method 1000 may be performed by the custom-domain controller 360 of the machine-learning server 140 using the database schema 600 as shown in FIGS. 1-3 and 6.

In operation 1010, the custom-domain controller 360 receives a prompt from a client device 160. The prompt may be received via the user interface presented in operation 930 of FIG. 9.

The custom-domain controller 360, in operation 1020, provides the prompt to an LLM instance and asks the LLM instance to identify a property of the prompt. For example, if the prompt is "Who won the world series in 1953?," the custom-domain controller 360 may provide the text "In the prompt 'Who won the world series in 1953?', what is the topic?" In this example, the topic is the property being identified. Other properties may include keywords, products, companies, people, or any suitable combination thereof.

In operation 1030, the custom-domain controller 360 requests text from a database based on the property. For example, if the topic is "baseball," text from the enhancement table 610 may be selected where the domain is "baseball." As another example, a configuration file, such as the configuration file 800 of FIG. 8, may be accessed to determine how to access text for the identified property. The custom-domain controller 360 provides the text to the LLM instance in operation 1040. After receiving the text, the LLM instance is enhanced with information relevant to the identified property. The custom-domain controller 360 provides the prompt to the LLM instance in operation 1050 and receives a response from the LLM instance in operation 1060.

In operation 1070, the custom-domain controller 360 provides the response to the client device. The custom-domain controller 360 may ask the LLM instance to provide a confidence measure for the response (e.g., by asking "What is your confidence score for the provided answer?"). Based on the confidence measure alone (e.g., "high" or "low") or the confidence measure (e.g., "89%" or "15%") in combination with a threshold (e.g., 70%), the custom-domain controller 360 determines whether the interaction is complete.

If the custom-domain controller 360 determines that the interaction is not complete, the user is prompted to provide a second prompt (e.g., additional information or details). Operations 1010-1070 are repeated for the second prompt. The additional text provided to the LLM instance in the repetition of operation 1040 further enhances the LLM instance and increases the likelihood that the response generated by the LLM instance will complete the interaction.

Alternatively, operations 1010, 1060, and 1070 may be repeated until the user indicates that the interaction is successful. For example, after the response is provided to the client device in operation 1070, the user may be asked, "Does this answer your question?". If the user responds in the affirmative, the interaction is complete. The completed interaction may be added to the enhanced context data for future LLM instances, reinforcing the training of the LLM. If the user responds in the negative, the user provides an additional prompt, repeating operation 1010, and the conversation with the LLM instance continues with repetition of operations 1060 and 1070. The completed interaction may be added to the enhanced context data for future LLM instances, correcting the LLM.

Sometimes the user might have tried a different solution which would have resolved the issue, if in this case the user volunteers this information, this information is further passed to the LLM instance along with the entire list of previously provided prompts, properties, retrieved text, and responses. The custom-domain controller 360 asks the LLM instance if the user provided solution is probable. In case there is an affirmative answer, the resolution is recorded in the database.

If the LLM instance rejects the user-provided resolution, this is recorded and is assigned to a support engineer for a manual check of the same. If the support engineer overrides the LLM instance's determination, the user-provided resolution is recorded in the database.

The custom-domain controller 360 requests the LLM instance to provide a refined set of keywords that would have helped in a quicker resolution of the issue. The keywords may be stored in the database for retrieval in response to future queries as enhanced context. This will improve the probability of a quicker resolution provided by future LLM instances. Thus, by use of the method 1000, the utility of the machine-learning server 140 is increased and the quality of the output generated by the LLM instance in response to the prompt is improved.

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors coupled to the memory and configured to execute the instructions to perform operations comprising: based on a domain for a session with a large language model (LLM), selecting a set of input text from a database; providing the selected set of input text to an instance of the LLM to prepare the LLM instance for the session; and causing a user interface to be presented that allows a user to interact with the prepared LLM instance.

In Example 2, the subject matter of Example 1, wherein the operations further comprise: preparing a plurality of LLM instances by providing different input text to each LLM instance of the plurality of LLM instances; and selecting, based on the domain, one of the LLM instances of the plurality of LLM instances.

In Example 3, the subject matter of Examples 1-2, wherein the operations further comprise: after the session with the prepared LLM instance, adding text of the session to the set of input text.

In Example 4, the subject matter of Examples 1-3, wherein the operations further comprise: based on a tenant for the session with the LLM, selecting a second set of input text from the database; and before causing the user interface to be presented that allows the user to interact with the prepared LLM instance, providing the selected second set of input text to the LLM instance to further prepare the LLM instance for the session.

In Example 5, the subject matter of Example 4, wherein the operations further comprise: after the session with the prepared LLM instance, adding text of the session to the second set of input text.

In Example 6, the subject matter of Examples 1-5, wherein the operations further comprise: determining that a response provided by the LLM instance to a prompt received via the user interface was rejected by the user; and based on a determination that additional information was received during the session to improve the response of the LLM instance, adding the additional information to the set of input text.

In Example 7, the subject matter of Examples 1-6, wherein the operations further comprise: based on an acceptance by the user of a response provided by the LLM instance to a prompt received via the user interface, adding the prompt and the response to the set of input text.

In Example 8, the subject matter of Examples 1-7, wherein the operations further comprise: based on a role of a user of the session with the LLM, selecting a second set of input text from the database; and before causing the user interface to be presented that allows the user to interact with the prepared LLM instance, providing the selected second set of input text to the LLM instance to further prepare the LLM instance for the session.

Example 9 is a non-transitory computer-readable medium that stores instructions that, when executed by one or more processors, cause the one or more processors to perform operations comprising: based on a domain for a session with a large language model (LLM), selecting a set of input text from a database; providing the selected set of input text to an instance of the LLM to prepare the LLM instance for the session; and causing a user interface to be presented that allows a user to interact with the prepared LLM instance.

In Example 10, the subject matter of Example 9, wherein the operations further comprise: preparing a plurality of LLM instances by providing different input text to each LLM instance of the plurality of LLM instances; and selecting, based on the domain, one of the LLM instances of the plurality of LLM instances.

In Example 11, the subject matter of Examples 9-10, wherein the operations further comprise: after the session with the prepared LLM instance, adding text of the session to the set of input text.

In Example 12, the subject matter of Examples 9-11, wherein the operations further comprise: based on a tenant for the session with the LLM, selecting a second set of input text from the database; and before causing the user interface to be presented that allows the user to interact with the prepared LLM instance, providing the selected second set of input text to the LLM instance to further prepare the LLM instance for the session.

In Example 13, the subject matter of Example 12, wherein the operations further comprise: after the session with the prepared LLM instance, adding text of the session to the second set of input text.

In Example 14, the subject matter of Examples 9-13, wherein the operations further comprise: determining that a response provided by the LLM instance to a prompt received via the user interface was rejected by the user; and based on a determination that additional information was received during the session to improve the response of the LLM instance, adding the additional information to the set of input text.

In Example 15, the subject matter of Examples 9-14, wherein the operations further comprise: based on a role of a user of the session with the LLM, selecting a second set of input text from the database; and before causing the user interface to be presented that allows the user to interact with the prepared LLM instance, providing the selected second set of input text to the LLM instance to further prepare the LLM instance for the session.

Example 16 is a method comprising: based on a domain for a session with a large language model (LLM), selecting, by one or more processors, a set of input text from a database; providing, by the one or more processors, the selected set of input text to an instance of the LLM to prepare the LLM instance for the session; and causing a user interface to be presented that allows a user to interact with the prepared LLM instance.

In Example 17, the subject matter of Example 16 includes, after the session with the prepared LLM instance, adding text of the session to the set of input text.

In Example 18, the subject matter of Examples 16-17 includes, based on a tenant for the session with the LLM, selecting a second set of input text from the database; and before causing the user interface to be presented that allows the user to interact with the prepared LLM instance, providing the selected second set of input text to the LLM instance to further prepare the LLM instance for the session.

In Example 19, the subject matter of Example 18 includes, after the session with the prepared LLM instance, adding text of the session to the second set of input text.

In Example 20, the subject matter of Examples 16-19 includes determining that a response provided by the LLM instance to a prompt received via the user interface was rejected by the user; and based on a determination that additional information was received during the session to improve the response of the LLM instance, adding the additional information to the set of input text.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 11:
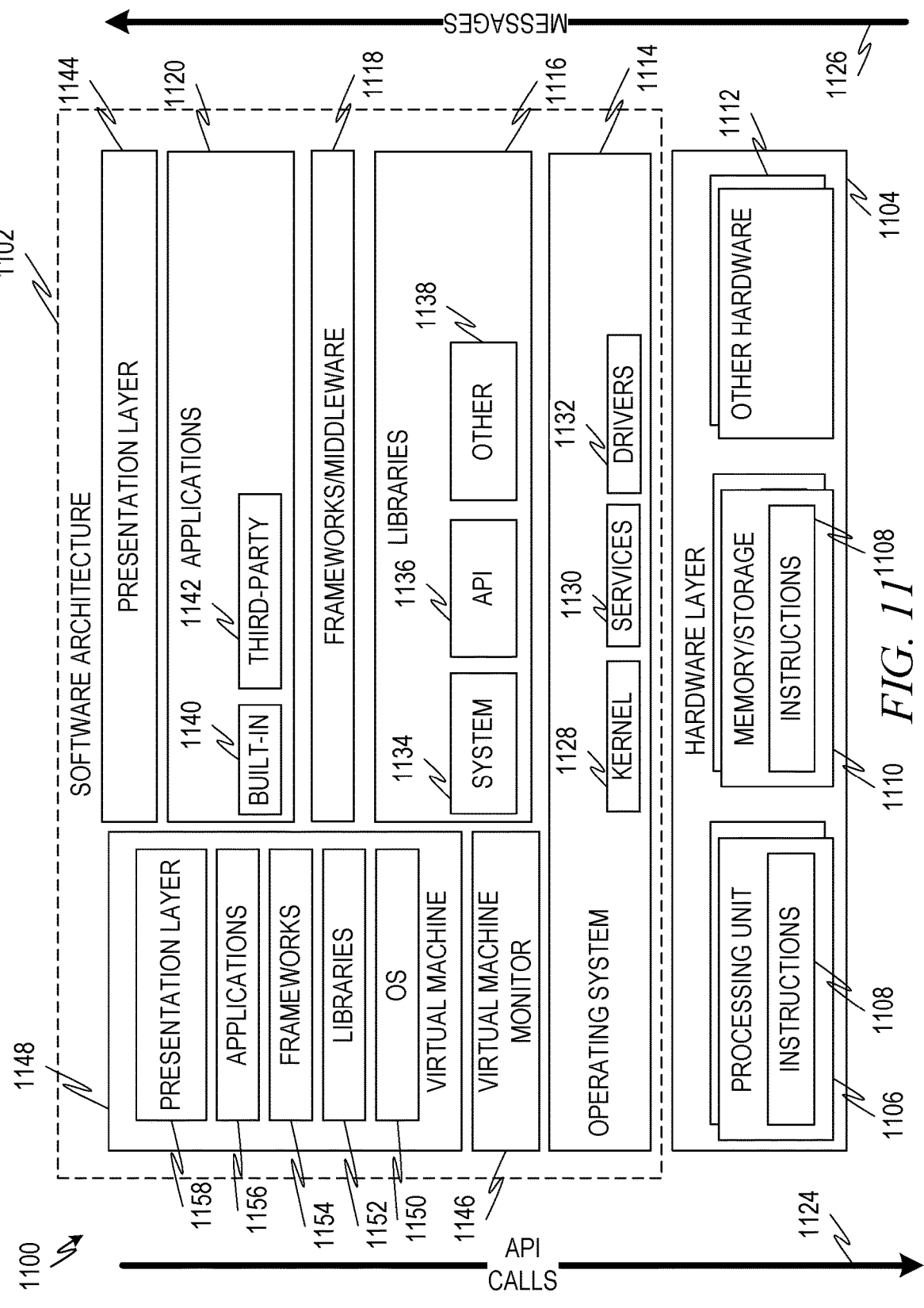
FIG. 11 is a block diagram showing one example of a software architecture for a computing device.

FIG. 11 is a block diagram 1100 showing one example of a software architecture 1102 for a computing device. The software architecture 1102 may be used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 11.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of the software architecture 1102.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 may provide a higher-level common infrastructure that may be utilized by the applications 1120 and/or other software components/modules. For example, the frameworks/middleware 1118 may provide various graphical user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system libraries 1134, API libraries 1136, and other libraries 1138), frameworks/middleware 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 12:
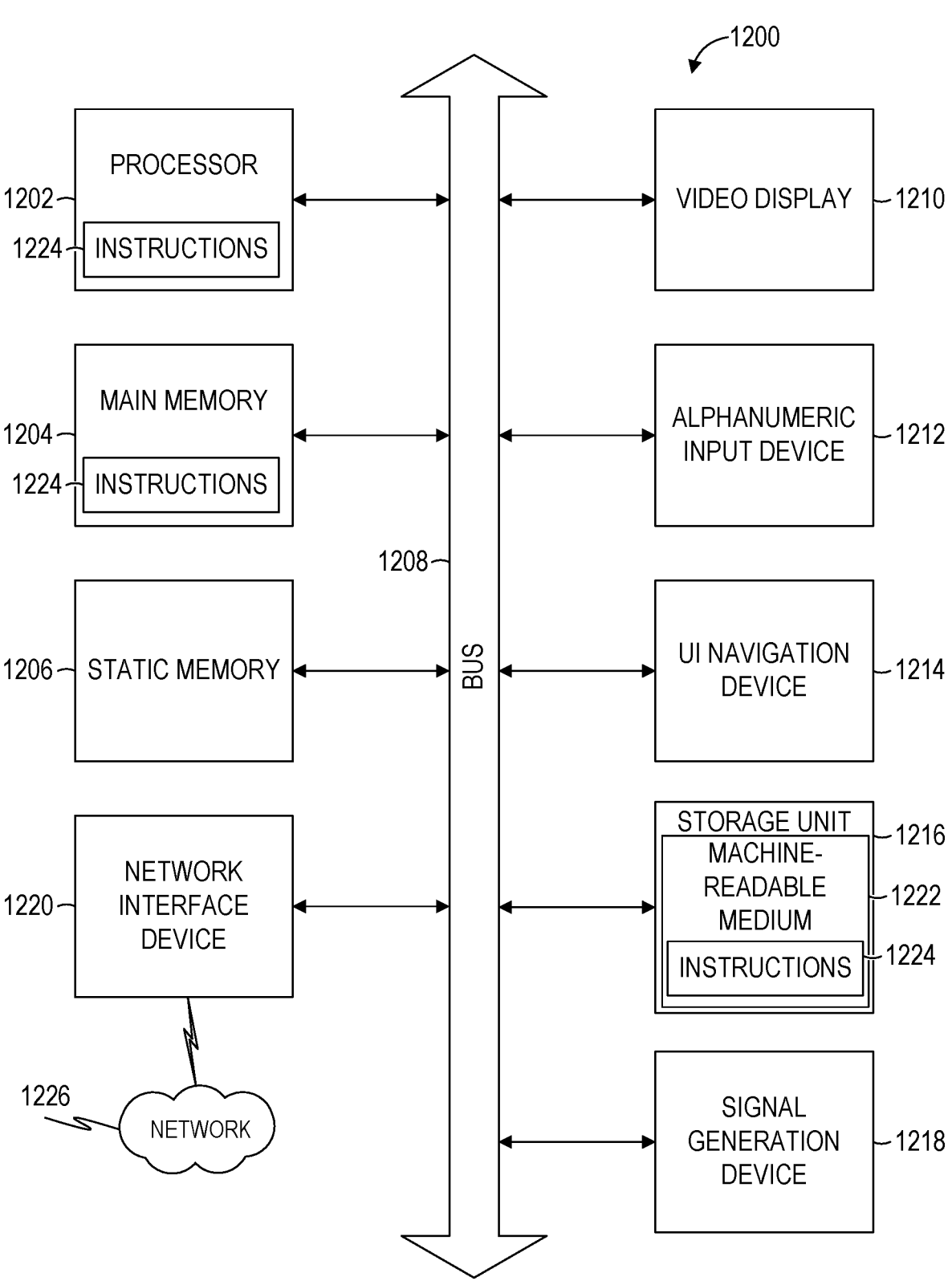
FIG. 12 is a block diagram of a machine in the example form of a computer system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface navigation (or cursor control) device 1214 (e.g., a mouse), a storage unit 1216, a signal generation device 1218 (e.g., a speaker), and a network interface device 1220.

Machine-Readable Medium

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in FIG. 12 to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:

a memory that stores instructions; and one or more processors coupled to the memory and configured to execute the instructions to perform operations comprising:

based on a domain for a session with a large language model (LLM), selecting a first set of input text from a database;

based on a tenant for the session with the LLM, selecting a second set of input text from the database;

providing the first set of input text to an instance of the LLM to prepare the LLM instance for the session;

providing the second set of input text to the instance of the LLM to further prepare the LLM instance for the session; and causing a user interface to be presented that allows a user to interact with the prepared LLM instance.

2. The system of claim 1, wherein the operations further comprise:

preparing a plurality of LLM instances by providing different input text to each LLM instance of the plurality of LLM instances; and selecting, based on the domain, one of the LLM instances of the plurality of LLM instances.

3. The system of claim 1, wherein the operations further comprise:

after the session with the prepared LLM instance, adding text of the session to the first set of input text.

4. The system of claim 1, wherein the operations further comprise:

after the session with the prepared LLM instance, adding text of the session to the second set of input text.

5. The system of claim 1, wherein the operations further comprise:

determining that a response provided by the LLM instance to a prompt received via the user interface was rejected by the user; and based on a determination that additional information was received during the session to improve the response of the LLM instance, adding the additional information to the first set of input text.

6. The system of claim 1, wherein the operations further comprise:

based on an acceptance by the user of a response provided by the LLM instance to a prompt received via the user interface, adding the prompt and the response to the first set of input text.

7. The system of claim 1, wherein the operations further comprise:

based on a role of the user, selecting a third set of input text from the database; and before causing the user interface to be presented that allows the user to interact with the prepared LLM instance, providing the selected third set of input text to the LLM instance to further prepare the LLM instance for the session.

8. The system of claim 1, wherein the operations further comprise:

receiving a first prompt via the user interface;

providing a second prompt to the LLM instance, the second prompt asking the LLM to identify a property of the first prompt;

based on the property identified by the LLM, selecting a third set of input text from the database;

providing the third set of input text and the first prompt to the LLM to generate a response; and providing the response to the user via the user interface.

9. A non-transitory computer-readable medium that stores instructions that, when executed by one or more processors, cause the one or more processors to perform operations comprising:

based on a domain for a session with a large language model (LLM), selecting a first set of input text from a database;

based on a tenant for the session with the LLM, selecting a second set of input text from the database;

providing the first set of input text to an instance of the LLM to prepare the LLM instance for the session;

providing the second set of input text to the instance of the LLM to further prepare the LLM instance for the session; and causing a user interface to be presented that allows a user to interact with the prepared LLM instance.

10. The non-transitory computer-readable medium of claim 9, wherein the operations further comprise:

preparing a plurality of LLM instances by providing different input text to each LLM instance of the plurality of LLM instances; and selecting, based on the domain, one of the LLM instances of the plurality of LLM instances.

11. The non-transitory computer-readable medium of claim 9, wherein the operations further comprise:

after the session with the prepared LLM instance, adding text of the session to the first set of input text.

12. The non-transitory computer-readable medium of claim 9, wherein the operations further comprise:

after the session with the prepared LLM instance, adding text of the session to the second set of input text.

13. The non-transitory computer-readable medium of claim 9, wherein the operations further comprise:

determining that a response provided by the LLM instance to a prompt received via the user interface was rejected by the user; and based on a determination that additional information was received during the session to improve the response of the LLM instance, adding the additional information to the first set of input text.

14. The non-transitory computer-readable medium of claim 9, wherein the operations further comprise:

based on a role of the user, selecting a third set of input text from the database; and before causing the user interface to be presented that allows the user to interact with the prepared LLM instance, providing the selected third set of input text to the LLM instance to further prepare the LLM instance for the session.

15. The non-transitory computer-readable medium of claim 9, wherein the operations further comprise:

receiving a first prompt via the user interface;

providing a second prompt to the LLM instance, the second prompt asking the LLM to identify a property of the first prompt;

based on the property identified by the LLM, selecting a third set of input text from the database;

providing the third set of input text and the first prompt to the LLM to generate a response; and providing the response to the user via the user interface.

16. A method comprising:

based on a domain for a session with a large language model (LLM), selecting, by one or more processors, a first set of input text from a database;

based on a tenant for the session with the LLM, selecting a second set of input text from the database;

providing the first set of input text to an instance of the LLM to prepare the LLM instance for the session;

providing the second set of input text to the instance of the LLM to further prepare the LLM instance for the session; and causing a user interface to be presented that allows a user to interact with the prepared LLM instance.

17. The method of claim 16, further comprising:

after the session with the prepared LLM instance, adding text of the session to the first set of input text.

18. The method of claim 16, further comprising:

after the session with the prepared LLM instance, adding text of the session to the second set of input text.

19. The method of claim 16, further comprising:

determining that a response provided by the LLM instance to a prompt received via the user interface was rejected by the user; and based on a determination that additional information was received during the session to improve the response of the LLM instance, adding the additional information to the first set of input text.

20. The method of claim 16, further comprising:

based on a role of the user, selecting a third set of input text from the database; and before causing the user interface to be presented that allows the user to interact with the prepared LLM instance, providing the selected third set of input text to the LLM instance to further prepare the LLM instance for the session.

* * * * *